(12) United States Patent
Manfredotti

(10) Patent No.: US 8,517,685 B2
(45) Date of Patent: Aug. 27, 2013

(54) DEVICE FOR REDUCING VIBRATION GENERATED BY ROTORCRAFT ROTOR, AND ROTORCRAFT PROVIDED WITH SUCH DEVICE

(75) Inventor: Thomas Manfredotti, La Colle sur Loup (FR)

(73) Assignee: Eurocopter, Marignane Cedex (FR)

( * ) Notice: Subject to any disclaimer, the term of this patent is extended or adjusted under 35 U.S.C. 154(b) by 422 days.

(21) Appl. No.: 12/908,451

(22) Filed: Oct. 20, 2010

(65) Prior Publication Data

US 2011/0097193 A1 Apr. 28, 2011

(30) Foreign Application Priority Data

Oct. 27, 2009 (FR) ..................................... 09 05167

(51) Int. Cl.
*B64C 27/32* (2006.01)
(52) U.S. Cl.
USPC ............. 416/145; 415/119; 74/574.2; 73/468
(58) Field of Classification Search
USPC ................ 415/119; 416/144, 145; 74/574.2; 73/468, 469, 470
See application file for complete search history.

(56) References Cited

U.S. PATENT DOCUMENTS

| | | | |
|---|---|---|---|
| 2,348,941 A | 5/1944 | Ware | |
| 3,540,809 A * | 11/1970 | Mard et al. ........................ | 416/1 |
| 4,212,588 A | 7/1980 | Fradenburgh | |
| 6,062,818 A * | 5/2000 | Manfredotti et al. ......... | 416/145 |
| 7,448,854 B2 * | 11/2008 | Jolly et al. ....................... | 416/1 |

FOREIGN PATENT DOCUMENTS

| | | |
|---|---|---|
| FR | 2018491 | 5/1970 |
| FR | 2733483 A1 | 10/1996 |
| FR | 2749901 A1 | 12/1997 |
| FR | 2768995 A1 | 4/1999 |
| WO | 9910233 | 3/1999 |

OTHER PUBLICATIONS

Search Report and Written Opinion; Application No. 09 05167; dated Jul. 20, 2010.

* cited by examiner

*Primary Examiner* — Nathaniel Wiehe
*Assistant Examiner* — Justin Seabe
(74) *Attorney, Agent, or Firm* — Brooks Kushman P.C.

(57) ABSTRACT

A device (10) for reducing vibration of a main rotor (1) having a support (20) and a plurality of heavy elements (30) and of rollers (50). Each heavy element (30) includes two first openings (31) respectively at least partially in registration with two second openings (22) of the support (20. Each roller (50) passes through a first opening (31) and a second opening (22). The device (10) has link means (60) for connecting the support (20) to the hub (2). A drive shaft (70) and a drive means (80) rotate at a first speed of rotation (V1) greater than a second speed of rotation (V2) of the hub (2). The drive shaft (70) rotates about an axis of rotation (AX1) of the support (20). The link means (60) is connected to the support (20) by a link member (90) enabling the support (20) to rotate about the axis of rotation (AX1) relative to the link means (60).

13 Claims, 2 Drawing Sheets

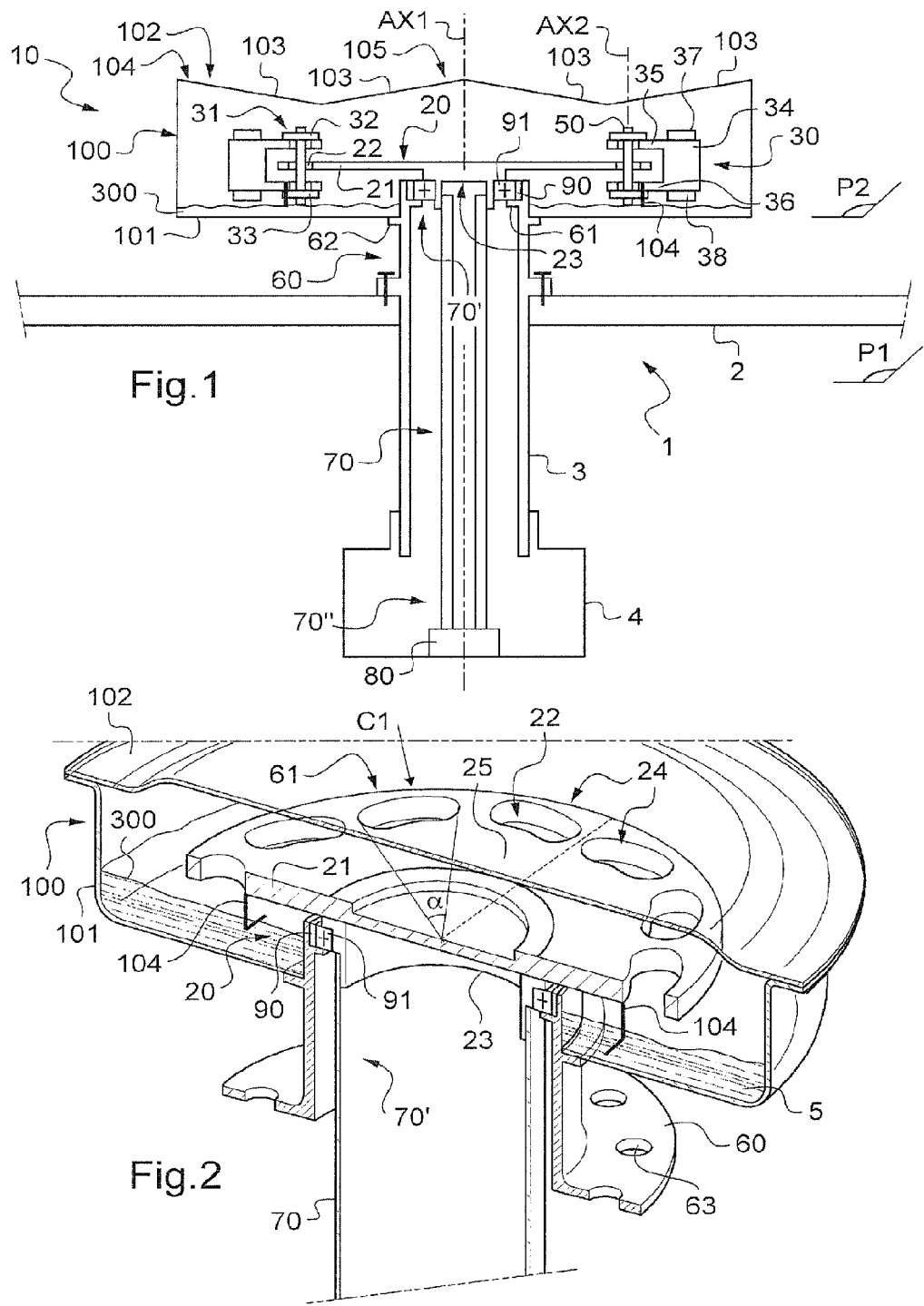

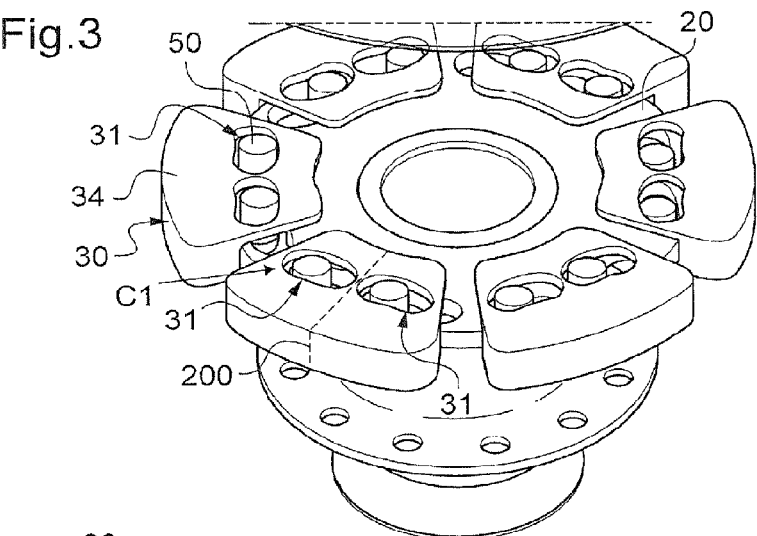
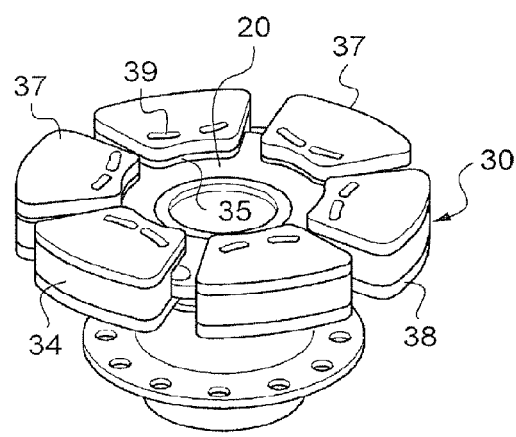
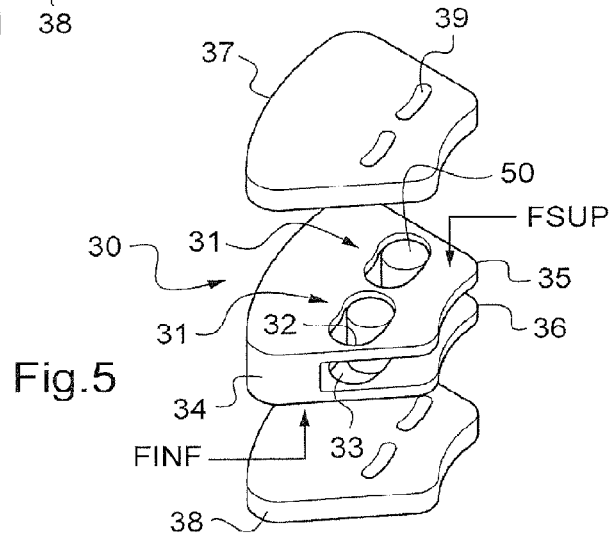

DEVICE FOR REDUCING VIBRATION GENERATED BY ROTORCRAFT ROTOR, AND ROTORCRAFT PROVIDED WITH SUCH DEVICE

CROSS-REFERENCE TO RELATED APPLICATION

This application claims the benefit of application no. FR 09 05167, filed Oct. 27, 2009, the disclosure of which is incorporated herein by reference.

FIELD OF THE INVENTION

The invention relates to a device for reducing the vibration generated by a rotorcraft rotor, and to a rotorcraft provided with such a device.

BACKGROUND OF THE INVENTION

In operation, a lift rotor of a rotorcraft, e.g. a main lift and propulsion rotor of a helicopter, generates parasitic forces at the head of the lift rotor. The parasitic forces then induce vibration that propagates to the airframe of the rotorcraft, which vibration is particularly perceptible in the cockpit of the rotorcraft.

To mitigate that drawback, devices have been made for attenuating the vibration that is generated, sometimes referred to as rotor head resonators.

In a first type of device, described in particular in document FR 2 749 901, use is made of a flapping weight that is movable along a direction and of return means suitable for repositioning the flapping weight in a predetermined position.

Devices of the first type are effective. Nevertheless, those devices of the first type are sometimes heavy.

Furthermore, since the speed of rotation of the rotor may vary, the frequency of the vibration to be attenuated varies accordingly. Unfortunately, since devices of the first type are designed to attenuate vibration at a given frequency, such devices of the first type are not capable of adapting to frequencies that vary.

It may be observed that document EP 1 007 406 describes a device of the spring-mass type.

In a second type of device, use is made of pendulums that oscillate under the effect of centrifugal force. Each pendulum comprises a heavy element connected to a hinge of a support, the support performing rotary movement about the axis of rotation of the main rotor. For example, the support is provided with a plurality of radial arms forming a star, each radial arm having a hinge connected to a heavy element.

Under such circumstances, and unlike devices of the first type, there is no need to make use of dedicated return means, since centrifugal force provides the required return force.

That feature gives devices of the second type the capacity to adapt automatically to variations in the frequency of the vibration for attenuation.

Indeed, any variation in the speed of rotation of the rotor gives rise not only to a variation in the frequency of the vibration for attenuation, but also to a variation in the centrifugal force exerted on the pendulum. Thus, such devices of the second type are said to be "automatically tuneable" or indeed "automatically adjustable".

As a function of the nature of the vibration to be damped, the pendulums can oscillate in a first plane perpendicular to the axis of rotation of the main rotor, or indeed in a second plane in which the axis of rotation of the main rotor is inscribed.

Document FR 2 733 483 presents a device of the second type as described above.

In a first variant of a device of the second type, referred to for convenience as a "simple pendular resonator", the heavy element is a flyweight connected by a link arm to a branch of the support, the support being secured to the hub of the rotor.

The resonant frequency ω of the resonator is given by the following first relationship:

$$\omega = \Omega \sqrt{\frac{L \times r}{r^2 + \frac{I_0}{m}}}$$

where:
Ω represents the speed of rotation of the support of the device in revolutions per second;
L represents a first distance between the axis of rotation of the main rotor and the hinge of the pendulum;
r represents a second distance between the center of gravity of the heavy element of the pendulum and its hinge to the support;
$I_0$ designates the inertia of the heavy element about the axis of pendular movement of the heavy element;
m represents the mass of the heavy element.

Although effective, it should be observed that a simple pendular resonator is tuned by adjusting the first distance and/or the second distance.

Consequently, in order to attenuate vibration at high frequencies, e.g. on a helicopter having more than four blades, two solutions may be envisaged.

In the first solution, the first distance needs to be long, which appears to be impossible as a result of the increase in mass and drag that results therefrom.

In the second solution, the second distance needs to be minimized. Nevertheless, that second solution is difficult to apply since it would be appropriate to use hinges that are over-dimensioned in order to support the heavy element.

Document FR 2 018 491 describes a second variant referred to by the person skilled in the art as a "bifilar pendular resonator", specifically for reducing vibration at high frequencies.

Each bifilar heavy element comprises a U-shaped counterweight which forms a junction jumper engaged astride a branch of a star-shaped support. The counterweight which forms a junction jumper is then provided with two first openings of circular section that co-operate with two second openings of circular section in the corresponding branch via two rollers.

When it is set into movement by centrifugal force, the heavy element moves in circular translation. It is recalled that a body is said to move in circular translation when the body is moving in a plane with two distinct points of the body describing two circular trajectories having the same radius but different centers.

It should be observed that document U.S. Pat. No. 4,212, 588 provides for the device to be arranged in a casing provided with partitions.

This second variant of a device of the second type is advantageous in that it makes it possible to reduce the first distance compared with a device made using the first variant.

Nevertheless, in a helicopter provided with a large number of blades, the first distance continues to be long.

Furthermore, it should be observed that the friction between a heavy element and the associated rollers, and between a branch of the support and the rollers associated therewith tends to damage the device as a whole, thereby giving rise to degradation in its performance.

In order to remedy that, an operator needs to lubricate the device for each flight, thereby giving rise to obvious difficulties.

Document FR 2 768 995 presents a third variant of a device of the second type, referred to for convenience as an "accelerated pendular resonator". According to that document, the heavy element is a flyweight connected by a link arm to a branch of the support, the support not being secured to the hub of the rotor but rather to a drive member rotating at a speed of rotation that is faster than the speed of rotation of the rotor. The resonant frequency ω of the resonator is given by the following first relationship:

$$\omega = \Omega \sqrt{\frac{L \times r}{r^2 + \frac{I_0}{m}}}$$

where:
- Ω represents the speed of rotation of the drive member that is faster than the speed of rotation of the main rotor, given as a number of revolutions per second;
- L represents a first distance between the axis of rotation of the main rotor and the hinge of the pendulum;
- r represents a second distance between the center of gravity of the heavy element of the pendulum and its hinge to the support;
- $I_0$ designates the inertia of the heavy element about the axis of pendular movement of the heavy element;
- m represents the mass of the heavy element.

Compared with the second variant, the first distance is consequently reduced considerably.

However, the device gives rise to non-negligible levels of aerodynamic drag.

SUMMARY OF THE INVENTION

An object of the present invention is thus to propose a device for reducing the vibration generated by a rotorcraft rotor while avoiding the above-mentioned limitations, the device making it possible to reduce vibration at a high frequency without giving rise to high levels of drag and optionally not requiring time-consuming maintenance actions.

According to one embodiment of the invention, a device for reducing the vibration of a rotorcraft main rotor provided with a hub and a plurality of blades possesses a support and a plurality of heavy elements and of rollers. Each heavy element includes two first openings respectively at least partially in registration with two second openings of the support. Each roller passes through a first opening and a second opening at least partially in registration with each other in order to attach a heavy element to the support. The device is provided with link means suitable for connecting the support to the hub, i.e. suitable for transmitting vibration from the support to the hub.

The invention is thus a device of the bifilar pendular resonator type. Each heavy element is suitable for moving in a circular translation.

This device includes a drive shaft and drive means rotating at a first speed of rotation. That speed is faster than a second speed of rotation of the hub. The drive shaft is constrained to rotate about an axis of rotation with the support and with the drive means. The link means is connected to the support by a link member. This enables the support to rotate about the axis of rotation relative to the link means.

Under such circumstances, the heavy elements of the device generate vibration suitable for attenuating the vibration created by the main rotor of a rotorcraft while they are rotating about the axis of rotation of the support at a first speed of rotation that is faster than the speed of rotation of the hub of the main rotor. This is contrary to that which is proposed by document U.S. Pat. No. 4,212,588, for example.

As a result the heavy elements can generate vibration at high frequencies, while being contained in a small space in the immediate proximity of the axis of rotation of the rotor. This is unlike the solution proposed in document FR 2 768 995, which is relatively bulky because of the pendular movements of the oscillating bodies used.

The invention may also include one or more of the following additional characteristics.

In order to enable relative rotation to take place between the support rotating at a first speed and the link means rotating at a second speed, the link member in one embodiment comprises a ball bearing.

For example, the ball bearing is arranged between a fastener shoulder of a root of the support constrained to rotate with the drive shaft, and an internal shoulder of the link means. Under such circumstances, the vibration generated by the circular translation of the heavy elements is transmitted to the hub successively via the support, then via the ball bearing having its outer cage fastened to the support, then by the link means fastened to the outer cage of the ball bearing.

Furthermore, in a first variant, the drive means is a motor dedicated to driving the support, i.e. an electric motor dedicated to driving the support and optionally housed in a gearbox.

In a second variant, the drive means is a rotary member of a power gearbox.

In addition, the device may include a protective casing hermetically fastened to the link means, the casing covering the support and the heavy elements fastened to the support via the rollers.

The protective casing is thus dissociated from the support means and the associated heavy elements. The casing and the support means are unconstrained to rotate together about the axis of rotation. Indeed, the casing is constrained to rotate with the link means, while the support is constrained to rotate with the drive shaft.

In this embodiment, the device then presents at least the following combination of means:
- drive means rotating at a first speed of rotation faster than a second speed of rotation of the hub, the drive shaft being constrained to rotate about an axis of rotation with the drive means and with the support;
- link means suitable for connecting the support to the hub and including a drive shaft, the link means being connected to the support by a link member thus enabling the support to rotate about the axis of rotation relative to the link means; and
- a protective casing hermetically fastened to the link means, the casing covering the support and the heavy elements fastened to the support via the rollers.

This combination, which is not a mere juxtaposition, enables vibration at a high frequency to be reduced, while minimizing generation of drag by having the casing present.

Furthermore, this combination can also minimize the maintenance actions that need to be performed.

It is possible to provide splash lubrication inside the casing. Thus, the casing may be partially filled with a lubricant, such as oil. This lubricant enables the device to be lubricated, and in particular enables the rollers to be lubricated so as to avoid premature wear, without requiring frequent intervention on the part of an operator.

Consequently, in an embodiment, the casing is provided with a bottom fairing hermetically secured to an outer shoulder of the link means. The casing has a top fairing fastened to the bottom fairing to form a closed container. Since the protective casing is fastened hermetically to the link means, the casing is sealed.

Furthermore, the top fairing optionally includes at least one sloping plane directed towards a roller. Thus, in flight, the lubricant of the device is set into motion inside the casing, and in particular becomes deposited on the top fairing.

When the rotorcraft is on the ground, the lubricant then slides along the inclined planes of the top fairing and becomes deposited on the rollers, without any human intervention.

In another aspect, the support includes at least one feed rod suitable for directing lubricant towards a second opening.

Each feed rod represents a scoop which goes from lubricant towards a second opening of the support. During rotary movement of the support, the lubricant runs along the feed rods and reaches the second openings.

Furthermore, since each heavy element has a top face and a bottom face suitable for facing a hub, at least one of the faces is secured to an additional weight that acts as an adjustment weight.

For example, a top additional weight is fastened to the top face, or a bottom additional weight is fastened to the bottom face, or indeed, a top additional weight and a bottom additional weight are fastened respectively to the top and bottom faces.

If an additional weight covers an entire face of the heavy element, the additional weight advantageously includes a slot facing each first opening in the associated heavy element so that lubricant can reach the first openings.

In addition to a device for reducing vibration of a main rotor, the invention also provides a rotorcraft provided with a main rotor having a hub. The hub is set into rotation by a rotor mast driven by a first stage of a power gearbox. The rotorcraft includes a device for reducing the vibration of the main rotor as described above and has a support and a plurality of heavy elements and rollers. Each heavy element has two first openings respectively at least partially in registration with two second openings of the support for attaching a heavy element to the support. Each roller passes through a first opening and a second opening at least partially in registration with each other. Optionally, the device is provided in particular with:

drive means rotating at a first speed of rotation faster than a second speed of rotation of the hub. The drive shaft is constrained to rotate about an axis of rotation with the drive means and with the support; and link means connecting the support to the hub and including a drive shaft. The link means is connected to the support by a link member that enables the support to rotate about the axis of rotation relative to the link means.

Furthermore, the rotorcraft may in particular possess a drive means that optionally comprises a rotary member of the power gearbox. The rotary member performs rotary motion at a first speed.

The drive means and the rotor mast are coaxial. For example, the rotor mast extends along the axis of rotation of the rotor to reach a terminal stage of the gearbox that sets it into rotation at a second speed. The drive means extends along the axis of rotation inside the rotor mast of the rotor to reach an intermediate stage of the power gearbox that sets it into rotation at a first speed.

BRIEF DESCRIPTION OF THE DRAWINGS

The invention and its advantages appear in greater detail from the following description of embodiments given by way of illustration with reference to the accompanying figures, in which:

FIG. 1 is a diagrammatic section of a device of the invention;

FIG. 2 is a fragmentary isometric view showing the support of the device without the heavy elements;

FIG. 3 is an isometric view showing the support fitted with heavy elements but without additional masses;

FIG. 4 is an isometric view showing the support fitted with heavy elements provided with additional masses; and FIG. 5 is an exploded view of a heavy element provided with additional masses.

DETAILED DESCRIPTION OF THE PREFERRED EMBODIMENT

Elements shown in more than one figure are given the same references in each of them.

FIG. 1 is a diagrammatic section of a device 10 for reducing the vibration of a main rotor 1 of a rotorcraft.

The main rotor 1 comprises a hub 2 extending in a first plane P1 to carry blades (not shown). In order for the blades to generate lift, the hub 2 is set into rotation by a terminal first stage of a power gearbox 4 via a rotor mast 3, the rotor mast being constrained to rotate about the axis of rotation AX1 with the hub 2 and with the terminal first stage of the power gearbox 4.

The movements of the blades while rotating about the axis of rotation AX1 cause vibration to be created that can be felt in the airframe of a rotorcraft by the occupants of the rotorcraft.

Consequently, the rotorcraft includes a device 10 suitable for reducing the vibration, the device 10 being a pendular resonator.

The device 10 has heavy elements 30 arranged on a support 20, and more precisely on a disk 21 of the support 20 that extends in a second plane P2 parallel to the first plane P1.

Each heavy element 30 is a junction jumper which forms a U-shaped counterweight provided with a top cheek 35 and a bottom cheek 36 extending from a common base 34. The top and bottom cheeks 35 and 36 are also spaced apart so as to define a gap in which the support 20 is engaged.

Furthermore, each heavy element 30 presents two first openings 31 at least partially facing two second openings 22 of the support 20, the second openings 22 being formed in the disk 21 of the support 20.

Under such circumstances, each first opening 31 of a heavy element 30 is made by means of a top perforation 32 formed in the top cheek 35 and by means of a bottom perforation 33 formed in the bottom cheek 36. The bottom perforation 33 of a first opening 31 is then in register with the top perforation 32, these bottom and top perforations 33 and 32 being symmetrical about a midplane of the heavy element 30.

In order to constrain each heavy element 30 and the support 20 to move in rotation about the axis of rotation AX1 of the main rotor, the device 10 has two rollers 50 per heavy element.

Consequently, each roller 50 is arranged along an arrangement axis AX2 parallel to the axis of rotation AX1, a roller passing through the first opening 31 and through the corresponding second opening 22. More precisely, a roller 50 passes in succession through a top perforation 32 of a first opening 31, the second opening 22 of the support 20, and then the bottom perforation 33 of the first opening 31.

It should be observed that a heavy element 30 may be arranged on either side of the disk 21 of the support 20 by using a roller with the means described in document FR 2 018 491, which is incorporated herein by reference.

Thus, each heavy element 30 is a heavy element of the bifilar type suitable for moving in circular translation under the effect of centrifugal forces relative to the support 20.

It should also be observed that each heavy element may be provided with additional adjustment weights 37 and 38.

Furthermore, the device 10 includes link means 60 linking it with the hub 2.

The link means 30 comprise a tube extending along the axis of rotation AX1, with a first end suitable for being fastened to the hub 2 by the conventional means, e.g. by screw fastening or by welding.

A second end of the link means 60 is then connected to the support 20 by a link member 90 enabling the support to turn about the axis of rotation AX1 relative to the link means 60.

In addition, the device 10 possesses a drive shaft 70 for rotating the support 20 about the axis of rotation AX1, and drive means 80 for driving the drive shaft 70 in rotation.

The support 20 has a cylindrical root 23 secured to the disk 22 and presenting circular symmetry about the axis of rotation AX1, and a first end zone 70' of the drive shaft 70 is then fastened to the support 20, more particularly to the root 21. The drive shaft 70 may be fastened to the root 21 of the support 20 by any conventional means, e.g. by the root 20 being a force fit in the drive shaft 70 and by welding.

The second end zone 70" of the drive shaft 70 is also fastened to the drive means 80. When the drive means 80 is placed in the power gearbox 4, the drive shaft 70 is coaxial with the rotor mast 3 and extends inside the rotor mast 3.

Advantageously, the drive means 80 drive the support 20 in rotation about the axis of rotation AX1 at a first speed of rotation V1 greater than a second speed of rotation V2 of the hub 2. Since the resonant frequency of the device 10 is proportional to the speed of rotation of the support of the bifilar heavy elements, it can be understood that the invention makes it possible to generate vibration at high frequencies.

Consequently, in a variant, the drive means 80 comprise an electric motor arranged in the bottom of the gearbox 4. Nevertheless, and depending on the space available, it is possible to envisage other arrangements for the electric motor, for example within the rotor mast 3.

In another variant, the drive means 80 comprise a rotary member of the power gearbox 4, namely an intermediate stage of the power gearbox 4.

It should be recalled that a power gearbox 4 of a rotorcraft serves in particular to convert rotary motion generated by a turbine engine having a speed of rotation r into rotary motion having a low speed of rotation of the order of a few hundreds of revolutions per minute. Consequently, the power gearbox 4 has a plurality of stages, with the rotor mast being driven by a terminal first stage.

Under such circumstances, it can be understood that an intermediate stage of the power gearbox 4, i.e. a stage that is upstream from the terminal stage, rotates at a first speed of rotation greater than the second speed of rotation of the terminal first stage.

It should be observed that the link member makes this operation possible, with the hub 2 and thus the link means 60 rotating at a speed of rotation and that is different from the speed of rotation of the support 20.

Thus, the link member 90 optionally possesses a ball bearing 91 disposed between a fastener shoulder of the root 23 of the support 20, and an internal shoulder 61 of the link means 60. It can be observed that the internal shoulder is provided on a surface of the link means 60 that faces the drive shaft 70, which explains its name.

In addition, the inner cage of the ball bearing may be secured to the root 21, while its outer cage may be secured to the link means 60.

Furthermore, in order to present minimum drag and in order to minimize maintenance operations, the device 10 possesses a protective casing 100 defining a container that is firstly hermetically closed around the support 20 together with the heavy elements 30 attached to the support 20, and that is secondly constrained to rotate with the link means 60 about the axis of rotation AX1.

The casing 100 then comprises a bottom fairing 101 engaged around the link means 60, the bottom fairing 101 being secured to an outer shoulder 62, e.g. by welding. It is also possible to implement a gasket in order to guarantee good sealing between the bottom fairing and the link means and 60.

The casing 100 then has a top fairing 102 fastened to the bottom fairing 101 to form the container.

In order to minimize maintenance operations, the casing 100 is partially filled with a lubricant 300, such as oil.

When the support 20 is set into rotation, the lubricant moves in the casing and in particular it lubricates the first and second openings 31 and 22 and also the rollers 50.

In order to optimize this lubrication, the top fairing 102 presents sloping planes 103 that are directed towards the rollers 50. Under such circumstances, and with reference to FIG. 1, the top fairing 102 presents:

an outer ring sloping from the outside of the top fairing 102 towards the center of the top fairing 102 in such a manner as to present a slope towards the rollers 50; and an inner ring sloping from the center of the top fairing 102 towards the outside of the top fairing 102 in such a manner as to present a slope towards the rollers 50.

Consequently, the lubricant deposited on the top fairing tends to slide along the sloping planes 103 and spread over the rollers, and as a result over the first and second openings 31 and 22 that receive the rollers 50.

Furthermore, the device 10 may be provided with feed rods 104, possibly L-shaped rods, suitable for being in contact with the lubricant so as to direct it towards the first openings 31.

FIG. 2 is a fragmentary isometric view showing the support 20 of the device 10 without the heavy elements 30.

With reference to FIG. 2, the device 10 includes one feed rod 104 per second opening 22, each rod 104 being disposed close to a second opening 22.

Furthermore, it can be seen that the first and second openings 31 and 22 are circular in shape in one particular option.

In an alternative option, each opening describes a ring C1 on a predetermined circular arc α, the circular arc describing an angle of 15°, for example.

It can be said that each opening presents a section that is kidney-bean shaped.

Furthermore, the support 20 has pairs 24 of second openings 22, two second openings 22 of a given pair 24 presenting orthogonal symmetry relative to a radial section 25 of the disk 21 of the support 20.

Similarly, with reference to FIG. 3, since each heavy element possesses a pair of first openings that co-operate with pairs of second openings of the support 20 via the rollers 50, the first two openings 31 of each pair present orthogonal symmetry relative to a vertical plane of symmetry 200 of the heavy element 30.

Furthermore, in the figure, it can be seen that the heavy elements of the device 10 are distributed at equal distances around the periphery of the support disk 20.

With reference to FIGS. 4 and 5, each heavy element is provided with at least one additional adjustment weight 37 or 38.

With reference to FIG. 5, a top additional weight is fastened, e.g. reversibly using bolts, on a top face FSUP of the heavy element 30. Similarly, a bottom additional weight 38 is fastened, e.g. reversibly using bolts, to a bottom face FINF of the heavy element 30.

It should be observed that it is possible to envisage providing the element with a single additional weight, on its top face FSUP or on its bottom face FINF. In addition, each additional weight may include one or more distinct members.

Furthermore, FIG. 1 shows a version in which an additional weight partially overlies one face of the heavy element.

Conversely, in the version of FIG. 5, an additional weight covers one face of the heavy element completely.

Under such circumstances, in order to favor lubrication of the first openings and of the rollers, each additional weight may include a slot 39 facing each first opening 31.

Furthermore, the section of a slot has first dimensions that are smaller than the second dimensions of the corresponding first opening. In other words, a section of a said slot taken in isolation may be inscribed within a section of a first opening taken in isolation.

Under such circumstances, and in this variant, the rollers may be simple cylinders. It is then no longer necessary to provide means for fastening a roller, e.g. using bolts, since each roller is blocked vertically by the top and bottom additional weights.

Naturally, the present invention may be subjected to numerous variations as to its implementation. Although several embodiments are described, it should readily be understood that it is not conceivable to identify all possible embodiments exhaustively. It is naturally possible to envisage replacing the means described by any equivalent means without going beyond the ambit of the present invention.

What is claimed is:

1. A device for reducing the vibration of a rotorcraft main rotor provided with a hub and a plurality of blades, the device having
    a plurality of heavy elements,
    a support with a pair of second openings per heavy element,
    a plurality of rollers,
    each heavy element including
    two first openings that are respectively at least partially in registration with the pair of second openings of the support, each roller in the plurality of rollers passing through a first opening and a second opening at least partially in registration with each other in order to attach a heavy element to the support,
    link means for connecting the support to the hub,
    a drive shaft and drive means rotating at a first speed of rotation (V1) greater than a second speed of rotation (V2) of the hub, the drive shaft being constrained to rotate about an axis of rotation (AX1) with the support,
    a link member connecting the link means to the support the link member enabling the support to rotate about the axis of rotation (AX1) relative to the link means, and
    a protective casing provided with a bottom fairing hermetically fastened to an outer shoulder of the link means, the casing having a top fairing fastened to the bottom fairing to form a closed container, the top fairing including at least one sloping plane directed towards a roller, wherein the casing is hermetically fastened to the link means so as to be constrained to rotate with the link means about the axis of rotation (AX1), the casing covering the support and an element fastened to the support by the rollers, the casing being partially filled with a lubricant.

2. A device according to claim 1, wherein the link member comprises a ball bearing.

3. A device according to claim 1, wherein the drive means is a motor dedicated to driving the support.

4. A device according to claim 1, wherein the drive means is a rotary member of a power transmission gearbox.

5. A device according to claim 1, wherein the support includes at least one feed rod suitable for directing the lubricant towards a second opening.

6. A device according to claim 1, wherein each heavy element has a top face (FSUP) and a bottom face (FINF) suitable for facing a hub, and at least one of the faces (FINF, FSUP) is secured to an additional weight.

7. A device according to claim 6, wherein the additional weight includes a slot facing each first opening in the associated heavy element.

8. A device according to claim 1, wherein each of the first and second openings has a section describing a ring (Cl) on a predetermined circular arc ($\alpha$).

9. A rotorcraft having a main rotor comprising a hub, the hub being set into rotation by a rotor mast and driven by a first stage of a power transmission gearbox, wherein the rotorcraft includes a device for reducing vibration of the main rotor, the device having a support and a plurality of heavy elements and of rollers, each heavy element having two first openings respectively at least partially in registration with two second openings of the support, each roller passing through a first opening and a second opening at least partially in registration with each other in order to attach a heavy element to the support, the device being provided with:
    drive means rotating at a first speed of rotation (V1) greater than a second speed of rotation (V2) of the hub, the drive shaft being constrained to rotate about an axis of rotation (AX1) with the support;
    link means connecting the support to the hub and including a drive shaft, the link means being connected to the support by a link member enabling the support to rotate about the axis of rotation (AX1) relative to the link means; and
    a protective casing provided with a bottom fairing hermetically fastened to an outer shoulder of the link means, the casing having a top fairing fastened to the bottom fairing to form a closed container, the top fairing including at least one sloping plane directed towards a roller, the casing being fastened hermetically to the link means in such a manner as to be secured to rotate with the link means about the axis of rotation (AX1), the casing covering the support and the heavy elements fastened to the support via the rollers, the casing being partially filled with a lubricant.

10. A rotorcraft according to claim 9, wherein the drive means comprise a rotary member of the power gearbox, the rotary member performing rotary motion at the first speed of rotation (V1).

11. A rotorcraft according to claim 9, wherein the drive means and the rotor mast are coaxial.

12. A device for reducing the vibration of a rotorcraft main rotor provided with a hub and a plurality of blades, the device having
    a plurality of heavy elements, each heavy element having a top face (FSUP) and a bottom face (FINF) suitable for facing a hub, and at least one of the faces (FINF, FSUP) is secured to an additional weight, a support with a pair of second openings per heavy element,
a plurality of rollers,
each heavy element including
two first openings that are respectively at least partially in registration with the pair of second openings of the support, each roller in the plurality of rollers passing through a first opening and a second opening at least partially in registration with each other in order to attach a heavy element to the support,
link means for connecting the support to the hub,
a drive shaft and drive means rotating at a first speed of rotation (V1) greater than a second speed of rotation (V2) of the hub, the drive shaft being constrained to rotate about an axis of rotation (AX1) with the support,
a link member connecting the link means to the support the link member enabling the support to rotate about the axis of rotation (AX1) relative to the link means, and
a protective casing hermetically fastened to the link means so as to be constrained to rotate with the link means about the axis of rotation (AX1), the casing covering the support and an element fastened to the support by the rollers, the casing being partially filled with a lubricant.

13. A device according to claim 12, wherein the additional weight includes a slot facing each first opening in the associated heavy element.

* * * * *